(12) United States Patent
Noh et al.

(10) Patent No.: US 12,343,963 B2
(45) Date of Patent: Jul. 1, 2025

(54) AUTOMOBILE INTERIOR SHEET USING WASTE TPO (THERMOPLASTIC OLEFIN) COMPOSITE SHEET AND METHOD OF MANUFACTURING SAME

(71) Applicants: HYUNDAI MOTOR COMPANY, Seoul (KR); KIA CORPORATION, Seoul (KR)

(72) Inventors: Eun Ju Noh, Hwaseong-si (KR); In Soo Han, Uiwang-si (KR); Kyung Min Lee, Seoul (KR); Yong Bae Jung, Seoul (KR); Jae Hoon Woo, Seoul (KR); Gyu Il Son, Seoul (KR); Gyeong Pil Dong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 187 days.

(21) Appl. No.: 18/088,371

(22) Filed: Dec. 23, 2022

(65) Prior Publication Data
US 2023/0303810 A1    Sep. 28, 2023

(30) Foreign Application Priority Data

Mar. 28, 2022    (KR) .................. 10-2022-0038031

(51) Int. Cl.
*B32B 27/06* (2006.01)
*B32B 5/18* (2006.01)
(Continued)

(52) U.S. Cl.
CPC .............. *B32B 27/065* (2013.01); *B32B 5/18* (2013.01); *B32B 27/08* (2013.01); *B32B 27/32* (2013.01); *C08L 23/06* (2013.01); *C08L 23/12* (2013.01); *B29B 9/06* (2013.01); *B29C 48/0011* (2019.02); *B29C 48/07* (2019.02); *B29K 2023/06* (2013.01);
(Continued)

(58) Field of Classification Search
None
See application file for complete search history.

(56) References Cited

U.S. PATENT DOCUMENTS

2005/0140049 A1* 6/2005 James .................. C08L 23/16
                                                                524/502
2019/0002662 A1* 1/2019 Baldwin .............. B29C 44/24

FOREIGN PATENT DOCUMENTS

CN        1042864 A    6/1990
JP        S63-57355 A  3/1988
(Continued)

OTHER PUBLICATIONS

Suetsugu, M., Polyolefin Resin Composition, Jan. 25, 1994, machine translation of JP06-016876 (Year: 1994).*

*Primary Examiner* — Chinessa T. Golden
(74) *Attorney, Agent, or Firm* — Morgan, Lewis & Bockius LLP (57) ABSTRACT

An vehicle interior sheet, particularly a vehicle interior sheet using a waste TPO composite sheet capable of preventing environmental pollution by recycling industrial waste, and a method of manufacturing the same includes manufacturing a powder by pulverizing a waste TPO composite sheet, manufacturing recycled TPO resin pellets by processing the powder using an extruder, and manufacturing a recycled TPO layer by subjecting the recycled TPO resin pellets to calendering or extrusion molding.

7 Claims, 2 Drawing Sheets

(51) Int. Cl.
  B32B 27/08 (2006.01)
  B32B 27/32 (2006.01)
  C08L 23/06 (2006.01)
  C08L 23/12 (2006.01)
  B29B 9/06 (2006.01)
  B29C 48/00 (2019.01)
  B29C 48/07 (2019.01)
  B29K 23/00 (2006.01)
  B29K 105/26 (2006.01)
  B32B 27/30 (2006.01)
  B32B 27/40 (2006.01)

(52) U.S. Cl.
  CPC ...... *B29K 2023/12* (2013.01); *B29K 2105/26* (2013.01); *B32B 27/308* (2013.01); *B32B 27/40* (2013.01); *B32B 2255/10* (2013.01); *B32B 2255/26* (2013.01); *B32B 2266/025* (2013.01); *B32B 2272/00* (2013.01); *B32B 2274/00* (2013.01); *B32B 2605/003* (2013.01); *C08L 2203/14* (2013.01); *C08L 2205/03* (2013.01)

(56) References Cited

FOREIGN PATENT DOCUMENTS

| | | | |
|---|---|---|---|
| JP | 06016876 A | * | 1/1994 |
| KR | 10-1995-0028914 A | | 11/1995 |
| KR | 10-0203220 B1 | | 6/1999 |
| KR | 10-2001-0047096 A | | 6/2001 |
| KR | 10-0426375 B1 | | 4/2004 |
| KR | 10-2005-0005631 A | | 1/2005 |
| KR | 10-1081636 B1 | | 11/2011 |
| KR | 10-2012-0050741 A | | 5/2012 |
| KR | 10-1235235 B1 | | 2/2013 |
| KR | 10-2017-0133078 A | | 12/2017 |
| KR | 10-1946418 B1 | | 2/2019 |
| WO | 2019/224129 A1 | | 11/2019 |

* cited by examiner

AUTOMOBILE INTERIOR SHEET USING WASTE TPO (THERMOPLASTIC OLEFIN) COMPOSITE SHEET AND METHOD OF MANUFACTURING SAME

CROSS-REFERENCE TO RELATED APPLICATION

The present application claims priority to Korean Patent Application No. 10-2022-0038031, filed on Mar. 28, 2022, the entire contents of which is incorporated herein for all purposes by this reference.

BACKGROUND OF THE PRESENT DISCLOSURE

Field of the Present Disclosure

The present disclosure relates to a vehicle interior sheet, and to a vehicle interior sheet that utilizes a waste TPO composite sheet for preventing environmental pollution by recycling industrial waste, and a method of manufacturing the same.

Description of Related Art

Materials such as PVC, TPO, PP, PE, PU, cloth, etc. are generally used for vehicle interior sheets. Such an internal sheet is formed in a desired shape through a process such as vacuum molding, injection molding, wrapping, etc.

In recent years, a thermoplastic polyolefin-based elastomer (thermoplastic olefin (TPO)) sheet, which is advantageous from the aspects of environmental friendliness, lightness, fogging, and odor, has been rapidly adopted. The luxury of vehicle interior materials is accelerating competitiveness, and attention is focused on the development of internal materials that meet the increased expectations of buyers.

Meanwhile, thermoplastic polyolefin-based elastomers are widely used in plastic molded articles and internal and external materials for vehicles because they have excellent moldability, impact resistance, and chemical resistance, and have great advantages of low specific gravity and low price.

However, not only does the manufacture of sheets and articles using the thermoplastic polyolefin-based elastomer cause environmental pollution, but recycling and post-treatment thereof are almost impossible, which is environmentally unfriendly.

Hence, thorough research into the manufacture of eco-friendly molded products to replace the use of synthetic resin sheets and composite sheets, which are environmentally unfriendly, is ongoing these days.

Meanwhile, a conventional method of manufacturing a vehicle interior sheet including a TPO sheet includes forming a non-crosslinked TPO sheet through calendering or extrusion molding of a non-crosslinked TPO resin, forming a surface treatment layer by applying a surface treatment agent on the non-crosslinked TPO sheet, and bonding a crosslinked foam layer having a crosslinked chain to the non-crosslinked TPO sheet having the surface treatment layer formed thereon through electromagnetic beam irradiation.

Here, a waste composite TPO sheet in which a crosslinked chain is formed is generated, and it is difficult to break the crosslinked chain, so that the waste composite TPO sheet is considered industrial waste. In the case in which the crosslinked chain is broken and thus shortened, recycling thereof is difficult due to poor processability, and thus environmental pollution is aggravated due to the increase in waste generation, which is undesirable.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an eco-friendly vehicle interior sheet configured for preventing environmental pollution by recycling industrial waste and a method of manufacturing the same.

Various aspects of the present disclosure are directed to providing a vehicle interior sheet having mechanical properties equal to or superior to those of a conventional vehicle interior sheet and a method of manufacturing the same.

The objects of the present disclosure are not limited to the foregoing. The objects of the present disclosure will be able to be clearly understood through the following description and to be realized by the means described in the claims and combinations thereof.

Various aspects of the present disclosure are directed to providing a vehicle interior sheet including a recycled Thermoplastic olefin (TPO) layer including a recycled TPO resin, in which the recycled TPO resin is obtained from a waste TPO composite sheet.

The recycled TPO resin may include any one selected from the group consisting of polypropylene, polyethylene, a polypropylene copolymer including alpha-olefins having 2 to 12 carbon atoms, a polypropylene terpolymer including alpha-olefins having 2 to 12 carbon atoms, a polyethylene copolymer including alpha-olefins having 2 to 12 carbon atoms, a polyethylene terpolymer including alpha-olefins having 2 to 12 carbon atoms, a diene-based rubber, and combinations thereof.

The waste TPO composite sheet may include any one selected from the group consisting of a crosslinked TPO sheet, a laminate in which a non-crosslinked TPO sheet is stacked on a crosslinked foam layer, and combinations thereof.

The crosslinked TPO sheet may include a composite resin including at least one of polyethylene and polypropylene and an ethylene-propylene diene monomer, sulfur, oil, a reinforcing filler, a vulcanization activator, a vulcanization accelerator, and an antioxidant.

The recycled TPO layer may further include a non-recycled TPO resin, and the recycled TPO layer may include the recycled TPO resin and the non-recycled TPO resin mixed at a weight ratio of 1:0.1 to 1:9.

The vehicle interior sheet may further include a foam layer disposed under the recycled TPO layer, a surface treatment layer disposed on the recycled TPO layer, a cover layer disposed between the recycled TPO layer and the surface treatment layer, and a backside treatment layer disposed under the foam layer.

The cover layer may include any one selected from the group consisting of polypropylene, polyethylene, a polypropylene copolymer including alpha-olefins having 2 to 12 carbon atoms, a polypropylene terpolymer including alpha-olefins having 2 to 12 carbon atoms, a polyethylene copolymer including alpha-olefins having 2 to 12 carbon atoms, a polyethylene terpolymer including alpha-olefins having 2 to 12 carbon atoms, and combinations thereof.

Various aspects of the present disclosure are directed to providing a method of manufacturing the vehicle interior sheet including manufacturing a powder by pulverizing a waste TPO composite sheet, manufacturing recycled TPO resin pellets by processing the powder using an extruder, and manufacturing a recycled TPO layer by subjecting the recycled TPO resin pellets to calendering or extrusion molding.

The manufacturing the powder may include pulverizing the waste TPO composite sheet to an average particle size of 5 to 10 mm.

The manufacturing the recycled TPO resin pellets may include processing the powder using the extruder at a processing temperature of 150 to 300° C.

The manufacturing the recycled TPO layer may include subjecting the recycled TPO resin pellets to calendering at a speed of 10 to 30 m/min.

The manufacturing the recycled TPO layer may include subjecting the recycled TPO resin pellets to extrusion molding at a barrel zone temperature of 150 to 300° C.

The manufacturing the recycled TPO layer may include adding non-recycled TPO resin pellets to the recycled TPO resin pellets.

The adding the non-recycled TPO resin pellets may include mixing the recycled TPO resin pellets and the non-recycled TPO resin pellets at a weight ratio of 1:0.1 to 1:9.

The method of the present disclosure may further include manufacturing a laminate sheet by bonding a foam layer on the recycled TPO layer.

The manufacturing the laminate sheet may be performed at a heat treatment temperature of 150 to 210° C.

The method of the present disclosure may further include forming a surface treatment layer on a cover layer and bonding the cover layer having the surface treatment layer thereon on the laminate sheet.

The forming the surface treatment layer may include coating one surface of the cover layer with a surface treatment agent and then drying the surface treatment agent at a temperature of 80 to 150° C. for 0.5 to 3 minutes.

The bonding the cover layer having the surface treatment layer thereon on the laminate sheet may be performed at a treatment temperature of 150 to 210° C.

The method of the present disclosure may further include bonding a backside treatment layer under the laminate sheet.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The above and other features of the present disclosure will now be described illustrated in the accompanying drawings, which are provided hereinbelow by way FIG. 1 schematically shows a cross-sectional view of a vehicle interior sheet according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The above and other objects, features and advantages of the present invention will be more clearly understood from the following preferred embodiments taken in conjunction with the accompanying drawings. However, the present disclosure is not limited to the exemplary embodiments included herein, and may be modified into different forms. These embodiments are provided to thoroughly explain the present disclosure and to sufficiently transfer the spirit of the present disclosure to those skilled in the art.

It will be further understood that the terms "comprise", "include", "have", etc., when used in the present specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

The present disclosure pertains to a vehicle interior sheet using a waste TPO composite sheet and a method of manufacturing the same. The vehicle interior sheet is described in detail below.

Figure 1:
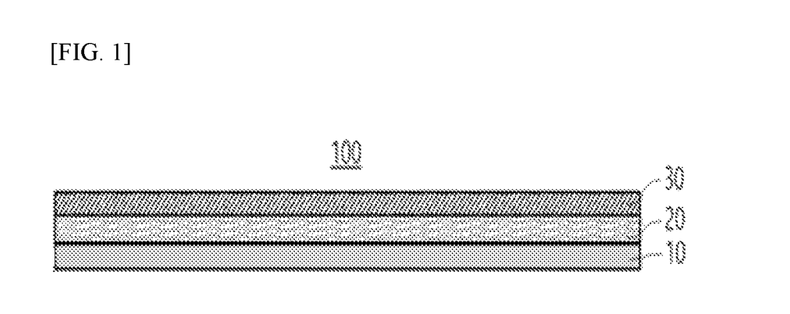

With reference to FIG. 1, a vehicle interior sheet according to various exemplary embodiments of the present disclosure is described below. Here, FIG. 1 schematically shows a cross-sectional view of a vehicle interior sheet according to various exemplary embodiments of the present disclosure.

As shown in FIG. 1, the vehicle interior sheet 100 according to various exemplary embodiments of the present disclosure includes a foam layer 10, a recycled TPO layer 20, and a surface treatment layer 30. The vehicle interior sheet 100 may include a foam layer 10, a recycled TPO layer 20, and a surface treatment layer 30, which are sequentially stacked.

(A) Recycled TPO Layer

The recycled TPO layer 20 includes a recycled Thermoplastic olefin (TPO) resin.

The recycled TPO resin may include any one selected from the group consisting of polypropylene, polyethylene, a polypropylene copolymer including alpha-olefins having 2 and 4 to 12 carbon atoms, a polypropylene terpolymer including alpha-olefins having 2 and 4 to 12 carbon atoms, a polyethylene copolymer including alpha-olefins having 2 and 4 to 12 carbon atoms, a polyethylene terpolymer including alpha-olefins having 2 and 4 to 12 carbon atoms, and combinations thereof.

Also, the recycled TPO resin may further include a first diene-based rubber. Specifically, the first diene-based rubber may be ethylene propylene rubber. The first diene-based rubber may include ethylene-propylene diene monomer (EPDM). EPDM is a terpolymer in which a small amount of a non-conjugated diene prevents complete saturation of the side-chain portion of the main chain, which is saturated with ethylene and propylene. EPDM may have an ethylene content of 50 to 80 wt %.

The recycled TPO resin utilizes a waste TPO composite sheet as a raw material, and may be obtained by pulverizing and pelletizing the waste TPO composite sheet using an extruder.

The waste TPO composite sheet may be any one selected from the group consisting of a crosslinked TPO sheet, a laminate structure in which a non-crosslinked TPO sheet and a crosslinked foam layer are bonded, and combinations thereof.

In an exemplary embodiment of the present disclosure, the crosslinked TPO sheet may be a TPO sheet manufactured through a physical or chemical crosslinking method. For example, the crosslinked TPO sheet may be a sheet obtained by passing a non-crosslinked TPO sheet, formed using a calendering machine or an extruder, through an electromagnetic beam crosslinking device, or may be a sheet made of a crosslinked TPO resin using a crosslinking agent. The crosslinked TPO sheet is a sheet manufactured using an electromagnetic beam crosslinking device, and may include, for example, TPV (thermoplastic vulcanizate) resin. The crosslinked TPO sheet may be formed by subjecting the non-crosslinked TPO sheet to electromagnetic beam irradiation (acceleration voltage: 0.8 kV, beam current: 20 to 100 mA).

The crosslinked TPO sheet may include a composite resin including at least one resin of polyethylene and polypropylene and EPDM, sulfur, oil, a reinforcing filler, a vulcanization activator, a vulcanization accelerator, and an antioxidant. The sulfur may be added to the composite resin together with a vulcanization accelerator to be described later to induce a dynamic crosslinking reaction. The oil may be paraffinic oil, and may be included in an amount of 25 parts by weight or less but exceeding 0 parts by weight based on 100 parts by weight of the composite resin. The reinforcing filler may be carbon black, and the carbon black may be included in an amount of 20 parts by weight or less but exceeding 0 parts by weight based on 100 parts by weight of the composite resin. The vulcanization activator may be any one selected from the group consisting of zinc oxide (ZnO), saturated fatty acid, and mixtures thereof. The saturated fatty acid may be, for example, stearic acid. Based on 100 parts by weight of the composite resin, the amount of zinc oxide may be 1 to 5 parts by weight, and the amount of saturated fatty acid may be 0.1 to 2 parts by weight. The vulcanization accelerator may be N-(1,3-dimethyl)N'-phenyl-p-phenylenediamine, and may be included in an amount of 0.1 to 2 parts by weight based on 100 parts by weight of the composite resin. The antioxidant may be a quinoline-based compound, particularly polymerized 2,2,4-trimethyl-1,2-dihydroquinoline, and may be included in an amount of 0.1 to 2 parts by weight based on 100 parts by weight of the composite resin.

In an exemplary embodiment of the present disclosure, the non-crosslinked TPO sheet may be a TPO sheet which is not subjected to physical or chemical crosslinking methods. For example, the non-crosslinked TPO sheet may be a TPO sheet, which is not passed through an electromagnetic beam crosslinking device and does not form crosslinks, or may be a sheet made from a non-crosslinked TPO resin not including a crosslinking agent. When the non-crosslinked TPO sheet is made of a non-crosslinked TPO resin, the non-crosslinked TPO resin may not include sulfur, oil, or a vulcanization accelerator, unlike the crosslinked TPO resin.

In an exemplary embodiment of the present disclosure, the crosslinked foam layer may be a foam layer having crosslinks formed through electromagnetic beam irradiation. The crosslinked foam layer may be formed by subjecting a foam layer, including a base resin composed of typical polyethylene and polypropylene mixed together, to electromagnetic beam irradiation (acceleration voltage of 0.03 to 0.8 kV). The base resin of the crosslinked foam layer may include, for example, 30 to 70 wt % of polypropylene and 30 to 70 wt % of polyethylene. The crosslinked foam layer may further include rubber such as EPDM to improve the surface texture thereof, as necessary. The amount of EPDM may include an amount of 5 to 50 wt % based on the total weight of the base resin of the crosslinked foam layer.

The recycled TPO layer 20 according to an exemplary embodiment of the present disclosure may further include a non-recycled TPO resin. In the present specification, the non-recycled TPO resin is a TPO resin to be distinguished from the recycled TPO resin, and may be a typical TPO resin that has not undergone a recycling process, unlike the recycled TPO resin.

The weight ratio of the recycled TPO resin and the non-recycled TPO resin may include 1:0.1 to 1:9, preferably 1:0.5 to 1:5, more preferably 1:1 to 1:4. When the recycled TPO layer is manufactured using the recycled TPO resin alone, the mechanical properties of the vehicle interior sheet, such as elongation, are deteriorated, so it is preferable to mix the non-recycled TPO resin with the recycled TPO resin. The chemical composition of the non-recycled TPO resin may be the same as or different from that of the recycled TPO resin.

The recycled TPO layer 20 may have a thickness of 0.1 to 0.6 mm, preferably 0.2 to 0.5 mm, and more preferably 0.2 to 0.4 mm. When the thickness of the recycled TPO layer falls within the above numerical range, the mechanical properties of the vehicle interior sheet may be maintained.

(B) Surface Treatment Layer

The surface treatment layer 30 may be disposed on the recycled TPO layer 20, and specifically, may be disposed directly on the recycled TPO layer 20.

In the present specification, the expression 'another member is disposed directly on one member' means that no member is interposed between these members.

The surface treatment layer 30 may include any one selected from the group consisting of a polyurethane resin, a chlorinated polypropylene resin, an acrylic resin, and combinations thereof, and preferably includes a polyurethane resin. For example, the chlorine content of chlorinated polypropylene may include an amount of 5 to 30 wt %. The acrylic resin may be, for example, methyl methacrylate.

The polyurethane resin used for the surface treatment layer 30 may be any one selected from the group consisting of a polycarbonate-based polyurethane resin, a polyester-based polyurethane resin, a polyether-based polyurethane resin, and mixtures thereof. The polyurethane resin used for the surface treatment layer 30 may be the same as or different from the polyurethane resin used for a backside treatment layer to be described later in FIG. 3

The surface treatment layer 30 may be an aqueous surface treatment layer made of an aqueous polyurethane resin, and the aqueous polyurethane resin may be water-soluble polyurethane, self-emulsifying polyurethane in which an anionic, cationic, or nonionic hydrophilic group is introduced to a polyurethane resin skeleton, forced-emulsifier-type polyurethane treated with a nonionic surfactant, or a resin which is emulsified and dispersed through mechanical shearing by mixing a hydrophobic polyurethane resin with a large amount of emulsifier.

When the surface treatment layer 30 is an aqueous surface treatment layer, an eco-friendly process may be implemented, thus preventing environmental pollution and improving the working environment.

The surface treatment layer 30 may have a thickness of 1 to 20 μm, preferably 3 to 10 μm, and more preferably 4 to 8 μm. If the thickness of the surface treatment layer 30 exceeds the above upper limit, the surface texture of the vehicle interior sheet may deteriorate, whereas if the thickness thereof is less than the above lower limit, the durability of the vehicle interior sheet may deteriorate. However, the technical spirit of the present disclosure is not limited to any thickness of the surface treatment layer.

(C) Foam Layer

The foam layer 10 may be disposed under the recycled TPO layer 20.

Because the foam layer 10 is not deformed in shape by physical external force, softness and cushioning properties of the vehicle interior sheet may be improved.

The foam layer 10 may have a thickness of 1.0 to 4.0 mm, preferably 1.5 to 3.3 mm, and more preferably 1.5 to 3.0 mm.

The foam layer 10 may include a first base resin. The first base resin may include polypropylene and polyethylene.

The foam layer 10 may further include a second diene-based rubber, in addition to the first base resin, to improve the surface texture thereof, as necessary. The polypropylene may be included in an amount of 40 to 80 wt %, preferably 40 to 70 wt %, more preferably 50 to 60 wt %, based on the total weight of the first base resin, and the polyethylene may be included in an amount of 20 to 60 wt %, preferably 30 to 60 wt %, and more preferably 40 to 50 wt %, based on the total weight of the first base resin.

The second diene-based rubber may be included in an amount of 5 to 50 wt %, preferably 10 to 30 wt %, more preferably 10 to 20 wt %, based on the total weight of the first base resin. Because the first base resin includes the second diene-based rubber, surface texture or touch may be improved compared to conventional PP foam in which a foam layer is composed exclusively of polyethylene and polypropylene. The second diene-based rubber may include ethylene propylene rubber, particularly EPDM. The ethylene content of the ethylene propylene rubber may include an amount of 50 to 80 wt %, preferably 55 to 75 wt %, more preferably 60 to 70 wt %. When the ethylene content of the ethylene propylene rubber falls within the above numerical range, the softness and durability of the foam layer may be sufficiently maintained. The weight average molecular weight of the ethylene propylene rubber may be 150,000 to 300,000 g/mol, preferably 170,000 to 280,000 g/mol, more preferably 200,000 to 250,000 g/mol. If the weight average molecular weight of the ethylene propylene rubber is less than the above lower limit, processing may become difficult due to incompatibility with other resins during production, whereas if the weight average molecular weight thereof exceeds the above upper limit, the raw materials may not be kneaded during extrusion and thus production may become impossible, which is undesirable.

According to an exemplary embodiment of the present disclosure, because the ethylene propylene rubber is included in the first base resin, the surface texture of the foam layer may be further improved.

The foam layer 10 may include a foaming agent in an amount of 3 to 20 parts by weight, preferably 5 to 10 parts by weight, more preferably 5 to 8 parts by weight, based on 100 parts by weight of the first base resin. If the amount of the foaming agent is less than the above lower limit, foam cells may not be sufficiently formed, and the surface texture and softness (or touch) of the vehicle interior sheet may deteriorate. On the other hand, if the amount thereof exceeds the above upper limit, foam cells may be formed in excess, and the durability of the vehicle interior sheet may be greatly deteriorated. The foam cells are spherical, and may be independent pores or closed pores, all of the walls of which are closed so that the pores are not connected to other pores. The foaming agent may be a capsule foaming agent or a chemical foaming agent, preferably a capsule foaming agent. The capsule foaming agent is provided in a form in which the foaming agent is contained in a fine spherical thermoplastic plastic cell structure having a size of 1 to 1000 μm. When the capsule foaming agent is heated, the thermoplastic plastic cells are softened and thus the foaming agent contained therein is vaporized to increase the internal pressure, whereby the capsule expands, ultimately forming a foam layer. The volume increase ratio of the foaming agent may be 100 to 500% after foaming at 220 to 230° C. Examples of the foaming agent may include azodicarbonamide (ADCA), p,p'-oxybisbenzenesulfonyl hydrazide, p-toluenesulfonyl hydrazide, and sodium bicarbonate, but the technical spirit of the present disclosure is not limited thereto.

The foam layer 10 may have a foaming magnification of 5 to 25 times, preferably 10 to 25 times, more preferably 15 to 25 times. If the foaming magnification of the foam layer is less than the above lower limit, the cells of the foam layer may not be sufficiently formed, and the surface texture of the vehicle interior sheet may deteriorate. On the other hand, if the foaming magnification thereof exceeds the above upper limit, the cells may be formed in excess, and thus bonding to the recycled TPO layer may become difficult and the durability of the vehicle interior sheet may be greatly deteriorated.

Figure 2:
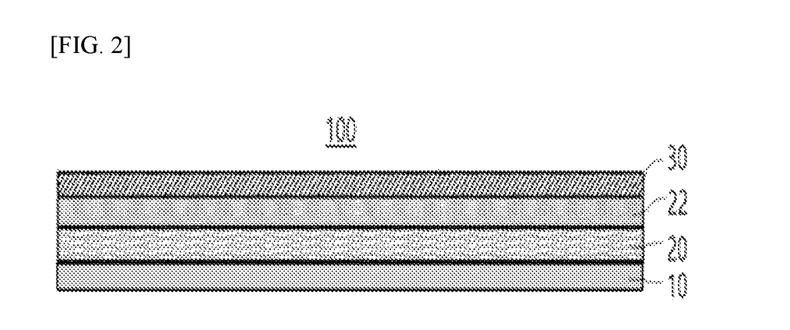
FIG. 2 schematically shows a cross-sectional view of a vehicle interior sheet according to various exemplary embodiments of the present disclosure.

Next, with reference to FIG. 2, a vehicle interior sheet 100 according to various exemplary embodiments of the present disclosure is described below. Here, FIG. 2 schematically shows a cross-sectional view of a vehicle interior sheet according to various exemplary embodiments of the present disclosure. A description of portions overlapping the above description is provided in brief or omitted.

As shown in FIG. 2, the vehicle interior sheet 100 according to various exemplary embodiments of the present disclosure may further include a cover layer 22. The vehicle interior sheet 100 according to various exemplary embodiments of the present disclosure may include a foam layer 10, a recycled TPO layer 20, a cover layer 22, and a surface treatment layer 30, which are stacked sequentially.

(D) Cover Layer

The cover layer 22 may be disposed on one surface of the recycled TPO layer. The cover layer 22 may be disposed directly on the recycled TPO layer 20.

Here, the surface treatment layer 30 may be disposed on one surface of the cover layer 22. The surface treatment layer 30 may be disposed directly on the cover layer 22, and may be formed by coating the surface of the cover layer 22 with a surface treatment agent.

The cover layer 22 may have a thickness of 0.3 to 0.7 mm, preferably 0.4 to 0.6 mm. When the thickness of the cover layer falls within the above numerical range, the properties of the vehicle interior sheet may be maintained.

The cover layer 22 may include any one selected from the group consisting of polypropylene, polyethylene, a polypropylene copolymer including alpha-olefins having 2 and 4 to 12 carbon atoms, a polypropylene terpolymer including alpha-olefins having 2 and 4 to 12 carbon atoms, a polyethylene copolymer including alpha-olefins having 2 and 4 to 12 carbon atoms, a polyethylene terpolymer including alpha-olefins having 2 and 4 to 12 carbon atoms, and combinations thereof.

Unlike the recycled TPO layer 20, the cover layer 22 may not include a recycled TPO resin. The cover layer 22 may be disposed on the surface of the recycled TPO layer 20 to thus increase surface hardness.

Figure 3:
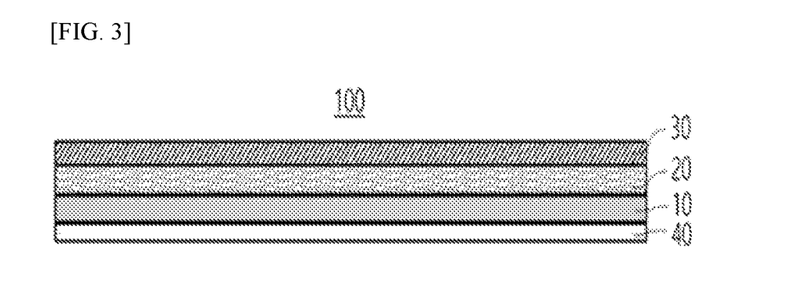
FIG. 3 schematically shows a cross-sectional view of a vehicle interior sheet according to various exemplary embodiments of the present disclosure.

Next, with reference to FIG. 3, a vehicle interior sheet 100 according to various exemplary embodiments of the present disclosure is described below. Here, FIG. 3 schematically shows a cross-sectional view of a vehicle interior sheet according to various exemplary embodiments of the present disclosure. A description of portions overlapping the above description is provided in brief or omitted.

As shown in FIG. 3, the vehicle interior sheet 100 according to various exemplary embodiments of the present disclosure may further include a backside treatment layer 40. The vehicle interior sheet 100 according to various exemplary embodiments of the present disclosure may include a backside treatment layer 40, a foam layer 10, a recycled TPO layer 20, and a surface treatment layer 30, which are sequentially stacked.

(E) Backside Treatment Layer

The backside treatment layer 40 may be disposed under one surface of the foam layer 10. Accordingly, the foam layer 10 may be disposed between the backside treatment layer 40 and the recycled TPO layer 20.

The backside treatment layer 40 may have a thickness of 1 to 5 preferably 1 to 3 more preferably 1 to 2 If the thickness of the backside treatment layer 40 exceeds the above upper limit, molding may become difficult, whereas if the thickness thereof is less than the above lower limit, durability may not be improved. However, the technical spirit of the present disclosure is not limited to any thickness of the backside treatment layer.

The backside treatment layer 40 may include any one selected from the group consisting of a polyurethane resin, a chlorinated polypropylene resin, an acrylic resin, and combinations thereof, and preferably includes a polyurethane resin.

When the backside treatment layer 40 is made of a combination of the above resins, it is preferable that a chlorinated polypropylene (CPP) resin be first applied and then a polyurethane resin or an acrylic resin be applied.

The polyurethane resin used to form the backside treatment layer 40 may be any one selected from the group consisting of a polycarbonate-based polyurethane resin, a polyester-based polyurethane resin, a polyether-based polyurethane resin, and mixtures thereof. The polyurethane resin may be prepared by reacting a polyol with a diisocyanate and a chain extender. The diisocyanate may be at least one selected from the group consisting of aromatic diisocyanates having a benzene ring, such as 4,4'-diphenylmethane diisocyanate (MDI), xylene diisocyanate (XDI), and 1,5-naphthalene diisocyanate, aliphatic diisocyanates such as hexamethylene diisocyanate (HDI) and propylene diisocyanate, and alicyclic diisocyanates such as 1,4-cyclohexanediisocyanate, isophorone diisocyanate (IPDI), and 4,4'-dicyclohexylmethane diisocyanate (H12MDI), and preferably at least one selected from the group consisting of 4,4'-diphenylmethane diisocyanate (MDI), isophorone diisocyanate (IPDI), and dicyclohexyl methane diisocyanate (H12MDI). The chain extender may include those commonly used in the art to which an exemplary embodiment of the present disclosure belongs, and an exemplary example thereof is a low-molecular-weight diol compound or diamine compound having an even number of repeating units, which is advantageous for increasing crystallinity. The chain extender is preferably at least one selected from the group consisting of ethylene glycol (EG), diethylene glycol (DEG), propylene glycol (PG), 1,4-butanediol (1,4-BD), 1,6-hexanediol (1,6-HD), methylpentanediol, and isophoronediamine (IPDA). The polyurethane resin may be an aqueous polyurethane resin or an oil-based polyurethane resin. The aqueous polyurethane resin may be water-soluble polyurethane, self-emulsifying polyurethane in which an anionic, cationic, or nonionic hydrophilic group is introduced to a polyurethane resin skeleton, forced-emulsifier-type polyurethane treated with a nonionic surfactant, or a resin emulsified and dispersed through mechanical shearing by mixing a hydrophobic polyurethane resin with a large amount of emulsifier. The aqueous polyurethane resin shows elasticity and flexibility of water-insoluble polyurethane, so it is able to impart unique properties of polyurethane, such as elasticity, stretchability, durability, and the like, in the final vehicle interior sheet.

Figure 4:
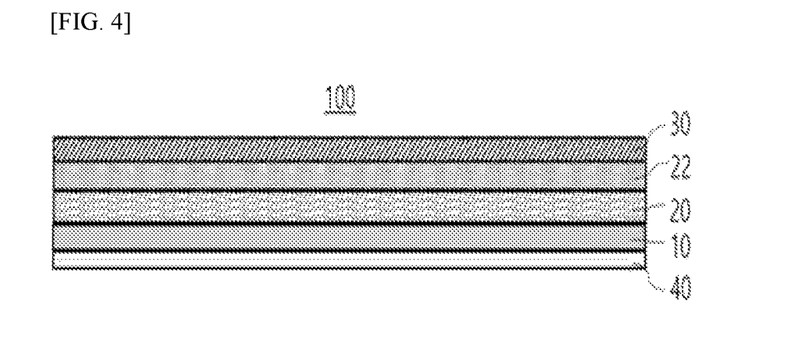
FIG. 4 schematically shows a cross-sectional view of a vehicle interior sheet according to various exemplary embodiments of the present disclosure.

Next, with reference to FIG. 4, a vehicle interior sheet 100 according to various exemplary embodiments of the present disclosure is described below. Here, FIG. 4 schematically shows a cross-sectional view of a vehicle interior sheet according to various exemplary embodiments of the present disclosure. A description of portions overlapping the above description is provided in brief or omitted.

As shown in FIG. 4, the vehicle interior sheet 100 according to various exemplary embodiments of the present disclosure may include a backside treatment layer 40, a foam layer 10, a recycled TPO layer 20, a cover layer 22, and a surface treatment layer 30, which are sequentially stacked.

The vehicle interior sheet 100 according to an exemplary embodiment of the present disclosure may include recycled industrial waste, thus reducing the amount of waste, preventing environmental pollution, reducing manufacturing costs, and attaining economically efficient processing.

Another aspect of the present disclosure pertains to a method of manufacturing a vehicle interior sheet using a waste TPO composite sheet. Hereinafter, the present disclosure is described in more detail with reference to FIG. 5.

Figure 5:
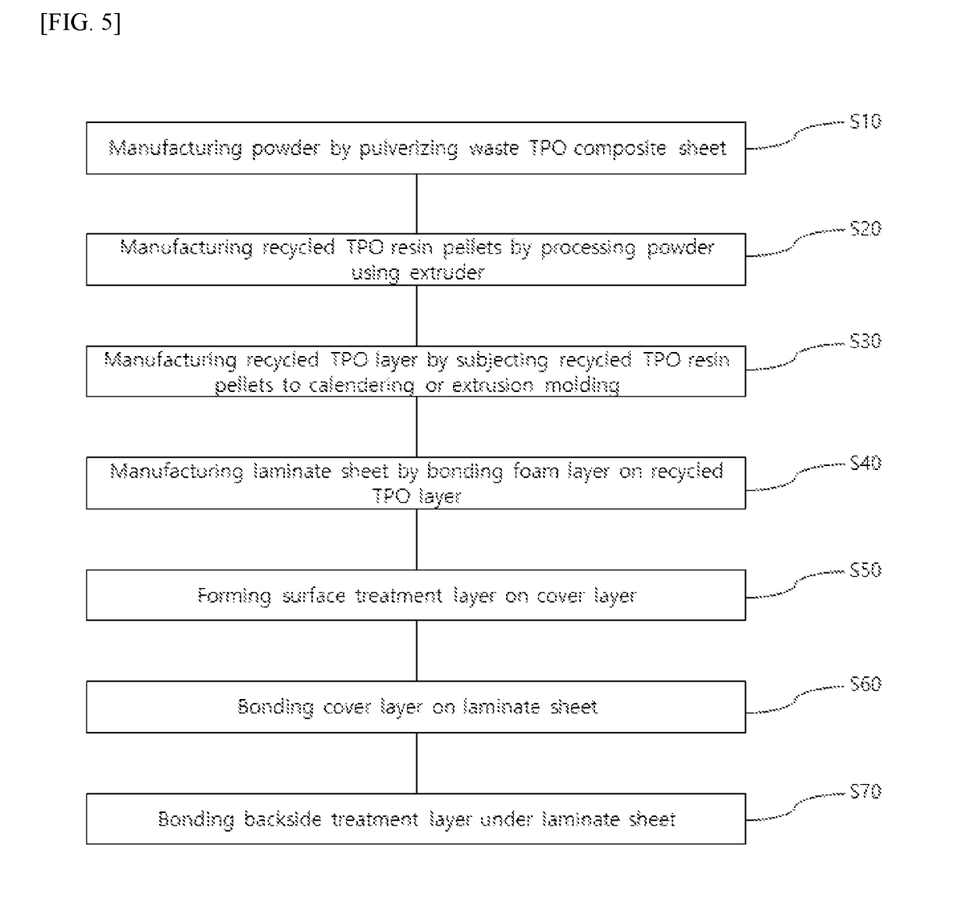
FIG. 5 is a flowchart showing a process of manufacturing a vehicle interior sheet according to an exemplary embodiment of the present disclosure.

FIG. 5 is a flowchart showing a process of manufacturing a vehicle interior sheet according to an exemplary embodiment of the present disclosure.

The method of manufacturing the vehicle interior sheet according to an exemplary embodiment of the present disclosure includes manufacturing a powder by pulverizing a waste TPO composite sheet (S10), manufacturing recycled TPO resin pellets by processing the powder using an extruder (S20), and manufacturing a recycled TPO layer by subjecting the recycled TPO resin pellets to calendering or extrusion molding (S30).

The method of manufacturing the vehicle interior sheet according to an exemplary embodiment of the present disclosure may further include, after S30, manufacturing a laminate sheet by bonding a foam layer on the recycled TPO layer (S40), forming a surface treatment layer on a cover layer (S50), bonding the cover layer having the surface treatment layer thereon on the laminate sheet (S60), and bonding a backside treatment layer under the laminate sheet (S70).

Hereinafter, each step of the method of manufacturing the vehicle interior sheet according to an exemplary embodiment of the present disclosure is described in detail.

First, in S10, a powder is manufactured by pulverizing a waste TPO composite sheet.

The waste TPO composite sheet may include any one selected from the group consisting of a crosslinked TPO sheet, a laminate in which a non-crosslinked TPO sheet is stacked on a crosslinked foam layer, and combinations thereof.

The average particle size of the pulverized powder is preferably 5 to 10 mm. When the average particle size of the powder falls within the above numerical range, pelletization using an extruder may be easily achieved.

S10 may be performed using a typical extruder, and may be necessary for pelletization.

Subsequently, in S20, recycled TPO resin pellets are manufactured by processing the powder.

In S20, recycled TPO resin pellets may be manufactured by processing the powder using the extruder at a processing temperature of 150 to 300° C. Preferably, the processing temperature is 230 to 240° C. Here, the processed recycled TPO resin pellets may have the same composition and properties as the recycled TPO resin described above.

If the processing temperature of the extruder is less than the above lower limit, not only may the mechanical properties thereof deteriorate, but also the surface state of the recycled TPO layer may be unsuitable, and pellet formation may be poor. On the other hand, if the processing temperature thereof exceeds the above upper limit, the pellets may be agglomerated into a lump, and elongation at break of the vehicle interior sheet may be too low.

Subsequently, in S30, a recycled TPO layer may be manufactured by subjecting the recycled TPO resin pellets to calendaring or extrusion molding.

In S30, non-recycled TPO resin pellets may be added to and mixed with the recycled TPO resin pellets to satisfy the specified properties for a vehicle interior.

The non-recycled TPO resin pellets may have the same or different composition as the recycled TPO resin pellets, and may have the same properties as the non-recycled TPO resin described above.

Here, the recycled TPO resin pellets and the non-recycled TPO resin pellets may be mixed at a weight ratio of 1:0.1 to 1:9, preferably 1:0.5 to 1:5, more preferably 1:1 to 1:4. When the recycled TPO layer is manufactured using the recycled TPO pellets alone, the mechanical properties of the vehicle interior sheet such as elongation are deteriorated, so it is preferable to mix the recycled TPO pellets with the non-recycled TPO pellets.

When the recycled TPO resin pellets are subjected to calendering in S30, a recycled TPO layer may be manufactured at a processing speed of 10 to 30 m/min.

Also, when the recycled TPO resin pellets are subjected to extrusion molding in S30, a recycled TPO layer may be manufactured at a barrel zone temperature of 150 to 300° C., preferably 230 to 240° C.

Therefore, the method of manufacturing the vehicle interior sheet according to an exemplary embodiment of the present disclosure is capable of realizing an eco-friendly vehicle interior sheet by pulverizing and pelletizing the waste composite TPO sheet using an extruder under optimized processing conditions. By recycling the waste composite TPO sheet, the present disclosure is effective in terms of manufacturing costs and economic efficiency of processing.

Subsequently, in S40, a laminate sheet is manufactured by bonding the recycled TPO layer and a foam layer. Because the foam layer has been described above, a detailed description thereof is omitted below.

The laminate sheet may be a structure in which the recycled TPO layer is disposed directly on the foam layer.

In S40, a hot pressing process may be used as the method of bonding the recycled TPO layer and the foam layer, but the technical spirit of the present disclosure is not limited thereto, and various bonding methods may be used. For example, the hot pressing process is preferably performed under the condition that the product surface temperature is 150 to 210° C.

Subsequently, in S50, a surface treatment layer is formed on a cover layer. Because the cover layer and the surface treatment layer have been described above, a detailed description thereof is omitted below.

In S50, the surface treatment layer may be manufactured by applying a surface treatment agent on one surface of the cover layer and then drying the same. The surface treatment agent is preferably dried at 80 to 150° C. for 0.5 to 3 minutes.

Subsequently, in S60, the cover layer having the surface treatment layer thereon and the laminate sheet are bonded.

In S60, the hot pressing process described above may be used as the method of bonding the laminate sheet and the cover layer having the surface treatment layer thereon. The hot pressing process is preferably performed at a temperature of 150 to 210° C.

Finally, in S70, a backside treatment layer is bonded under the lamination sheet. Because the backside treatment layer has been described above, a detailed description thereof is omitted below.

In S70, the hot pressing process described above may be used as the method of bonding the laminate sheet and the backside treatment layer having the surface treatment layer thereon.

In S70, a vehicle interior sheet, in which the backside treatment layer 40, the foam layer 10, the recycled TPO layer 20, the cover layer 22, and the surface treatment layer 30 are stacked sequentially, may be ultimately manufactured.

A better understanding of the present disclosure may be obtained through the following examples. These examples are merely set forth to illustrate the present disclosure, and are not to be construed as limiting the scope of the present disclosure.

PREPARATION EXAMPLES 1 TO 3

Respective recycled TPO layers were manufactured according to the methods of Preparation Examples 1 to 3 using the components at processing temperatures set forth in Table 1 below.

Preparation Example 1

First, a crosslinked TPO sheet (thickness: 0.5 mm, width: 1100 mm) was prepared. Then, the crosslinked TPO sheet was pulverized to an average particle size of 5 mm using an extruder to obtain a TPO sheet powder. Then, the TPO sheet powder was pelletized at a processing temperature of 235° C. using the extruder to obtain TPO resin pellets.

Then, the TPO resin pellets were subjected to extrusion molding, manufacturing a recycled TPO layer having a thickness of 0.5 mm.

Here, the crosslinked TPO sheet that was used included a composite resin composed of 70 wt % of PP (H540 from LG-Caltex) and 30 wt % of EPDM (ENB type from Exxon), and based on 100 parts by weight of the composite resin, 3 parts by weight of carbon black (N220), 3 parts by weight of ZnO, 1 part by weight of stearic acid, 1.5 parts by weight of sulfur, 1 part by weight of a vulcanization accelerator (N-(1,3-dimethyl)N'-phenyl-p-phenylenediamine), 1 part by weight of an antioxidant (polymerized 2,2,4-trimethyl-1,2-dihydroquinoline), and 5 parts by weight of paraffinic oil (KL-900B). The crosslinked TPO sheet included a resin having a hardness (Shore A) of 90 and a melt index (MI, 230° C., 2.16 kg) of 19 g/10 min.

Preparation Example 2

A recycled TPO layer was manufactured in the same manner as in Preparation Example 1, with the exception that the processing temperature of the extruder was set to 225° C. instead of 235° C.

Preparation Example 3

A recycled TPO layer was prepared in the same manner as in Preparation Example 1, with the exception that the processing temperature of the extruder was set to 245° C. instead of 235° C.

TABLE 1

| Test sample | | Preparation Example 1 | Preparation Example 2 | Preparation Example 3 |
|---|---|---|---|---|
| Processing temperature (° C.) | | 235 | 225 | 245 |
| Raw material | Recycled TPO resin (%) 1) | 100 | 100 | 100 |

1) Recycled TPO resin:
Resin including base resin composed of 40 wt % of polypropylene, 40 wt % of polyethylene, and 20 wt % of EPDM, based on 100 parts by weight of the base resin, 3 parts by weight of ZnO, and 1 part by weight of stearic acid
Hardness (Shore A) of 90 and melt index (MI, 230° C., 2.16 kg) of 19 g/10 min The properties of the recycled TPO layers manufactured according to Preparation Examples 1 to 3 were measured and evaluated through the following evaluation methods. The results thereof are shown in Table 2 below.

[Evaluation]
1) Hardness (Shore A): Hardness (Shore A) was evaluated using a Shore A durometer according to the ISO 868 standard.
2) Elongation at break, tensile strength, and tear strength: Elongation at break, tensile strength, and tear strength were measured using a universal testing machine (UTM) according to the MS 300-31 standard.
3) Surface state: The surface state was observed using a scanning electron microscope (SEM).
4) Variation in properties: Variation in properties was measured based on the MS 300-31 standard.
5) Mass production of pellets: The mass production of pellets was evaluated using a scanning electron microscope (SEM).

TABLE 2

| Test sample | | Preparation Example 1 | Preparation Example 2 | Preparation Example 3 |
|---|---|---|---|---|
| 1) Hardness (Shore A) | Hs | 83 | 82 | 85 |
| 2-1) Elongation at break | % | 703 | 620 | 570 |
| 2-2) Tensile strength | kgf/cm$^2$ | 170 | 160 | 160 |
| 2-3) Tear strength | N/mm | 84 | 78 | 95 |
| 3) Surface state | | Suitable (○) | Unsuitable (X) | Fair (Δ) |
| 4) Variation in properties (%) | | 3% | 10% | 10% |
| 5) Mass production of pellets | | Good | X (poor pellet formation) | X (pellet agglomeration) |

As is apparent from the results of Table 2, in Preparation Example 2, in which the processing temperature was lower than 230° C., pellet formation was poor. Therefore, in Preparation Example 2, the thermosetting properties of the crosslinked foam layer were unchanged, and thus the surface state of the recycled TPO layer may be evaluated as unsuitable, and variation in properties may increase.

Likewise, in Preparation Example 3, in which the processing temperature was higher than 240° C., pelletization was difficult due to pellet agglomeration. Therefore, in Preparation Example 3, the properties of EPDM in the recycled TPO resin were deteriorated due to thermal aging, and thus there may be a problem in that the elongation at break is too low.

In contrast, in Preparation Example 1, in which the processing temperature was 235° C., pelletization was easy, the surface state of the recycled TPO layer was good, and there was little variation in mechanical properties.

Therefore, it can be found that, when the processing temperature for manufacture of the recycled TPO layer of the present disclosure fell in the range of 230 to 240° C., formation of the recycled TPO layer became easy.

EXAMPLES AND COMPARATIVE EXAMPLES

Respective vehicle interior sheets were manufactured according to the manufacturing methods of Examples 1 to 4 and Comparative Examples 1 and 2 using the components in the amounts shown in Tables 3 and 4 below.

Here, each of the crosslinked foam layer and the foam layer that were used included a base resin composed of 45 wt % of polypropylene, 45 wt % of polyethylene, and 10 wt % of EPDM, and 5 parts by weight of a foaming agent (azodicarbonamide) based on 100 parts by weight of the base resin. The crosslinked foam layer was subjected to an electromagnetic beam crosslinking process using electromagnetic beams at an acceleration voltage of 0.5 kV.

Also, the cover layer included 40 wt % of polypropylene, 40 wt % of polyethylene, and 20 wt % of EPDM, and the surface treatment agent was an aqueous polyurethane resin.

Then, the properties thereof were measured through the evaluation methods described in connection with the Preparation Examples. The results thereof are shown in Tables 3 and 4 below.

Hardness, elongation at break, tensile strength, and tear strength were evaluated according to the same test criteria as in Preparation Examples.

Also, the 50% modulus was evaluated using a universal testing machine (UTM) according to the MS 300-31 standard.

Also, heating shrinkage (%) was determined by measuring the change in length in each direction after heating the vehicle interior sheet sample to 100° C. according to the MS 300-31 standard.

Comparative Example 1

Comparative Example 1 was a vehicle interior sheet having a recycled TPO resin content of 0 wt %. In Comparative Example 1, a surface treatment layer was formed by applying a surface treatment agent on a non-recycled TPO layer made of 100 wt % of a non-recycled TPO resin. The surface treatment layer formed on the non-recycled TPO layer and the crosslinked foam layer were bonded to each other, manufacturing a vehicle interior sheet.

Example 1

A recycled TPO layer was manufactured by subjecting 30 wt % of the recycled TPO resin according to Preparation Example 1 and 70 wt % of a non-recycled TPO resin to kneading and extrusion molding. After formation of a surface treatment layer by applying a surface treatment agent on the recycled TPO layer, the recycled TPO layer having the surface treatment layer thereon and the foam layer were bonded to each other, manufacturing a vehicle interior sheet in which the recycled TPO layer and the foam layer were in contact with each other.

Example 2

An vehicle interior sheet was manufactured in the same manner as in Example 1, with the exception that a recycled TPO layer was formed by subjecting 50 wt % of the recycled TPO resin and 50 wt % of the non-recycled TPO resin to kneading and extrusion molding, instead of the recycled TPO layer made of 30 wt % of the recycled TPO resin according to Preparation Example 1 and 70 wt % of the non-recycled TPO resin.

Comparative Example 2

A surface treatment layer was formed by applying a surface treatment agent on a cover layer. Separately, a laminate sheet was manufactured by integrally bonding a crosslinked foam layer and a non-recycled TPO layer, after which the cover layer having the surface treatment layer thereon was bonded on the laminate sheet, manufacturing a vehicle interior sheet in which the cover layer and the non-recycled TPO layer were in contact with each other.

Example 3

An vehicle interior sheet was manufactured in the same manner as in Comparative Example 2, with the exception that the recycled TPO layer according to Example 1 was used, instead of the non-recycled TPO layer.

Example 4

An vehicle interior sheet was manufactured in the same manner as in Comparative Example 2, with the exception that the recycled TPO layer according to Example 2 was used, instead of the non-recycled TPO layer.

TABLE 3

| Test sample | | Comparative Example 1 | Example 1 | Example 2 |
|---|---|---|---|---|
| Amount of recycled TPO resin (wt %) | | 0 | 30 | 50 |
| Hardness (Hs) | Shore A | 81 | 83 | 86 |
| Elongation at break (%) | L direction | 802.1 | 783.0 | 747.4 |
| | W direction | 795.5 | 771.9 | 745.0 |
| Tensile strength (kgf/cm$^2$) | L direction | 244.4 | 250.7 | 266.4 |
| | W direction | 170.4 | 182.4 | 195.1 |
| 50% Modulus (kgf/cm$^2$) | L direction | 74.9 | 76.7 | 77.4 |
| | W direction | 55.45 | 56.2 | 57.2 |
| Tear strength (N/mm) | L direction | 94.7 | 96.8 | 100.5 |
| | W direction | 89.1 | 91.4 | 93.1 |
| Heating shrinkage (%) | L direction | −0.9 | −0.7 | −0.6 |
| | W direction | 0.1 | 0.2 | 0.1 |

TABLE 4

| Test sample | | Comparative Example 2 | Example 3 | Example 4 |
|---|---|---|---|---|
| Amount of recycled TPO resin (wt %) | | 0 | 15 | 25 |
| Hardness (Hs) | Shore A | 83 | 85 | 88 |
| Elongation at break (%) | L direction | 808.6 | 762.5 | 736.5 |
| | W direction | 773.4 | 762.8 | 745.2 |
| Tensile strength (kgf/cm$^2$) | L direction | 212.7 | 218.9 | 235.4 |
| | W direction | 168.5 | 175.9 | 188.8 |
| 50% Modulus (kgf/cm$^2$) | L direction | 56.6 | 66.8 | 69.1 |
| | W direction | 49.0 | 52.2 | 53.7 |
| Tear strength (N/mm) | L direction | 86.8 | 92.8 | 99.8 |
| | W direction | 82.2 | 82.8 | 85.2 |
| Heating shrinkage (%) | L direction | −0.8 | −0.6 | −0.4 |
| | W direction | 0.3 | 0.0 | −0.2 |

As is apparent from the results of Table 3, Examples 1 and 2 exhibited mechanical properties equivalent to those of Comparative Example 1, which is a conventional vehicle interior sheet.

Furthermore, Examples 3 and 4 also exhibited mechanical properties equivalent to those of Comparative Example 2, which is a conventional vehicle interior sheet.

Examples 1 to 4, in which the recycled TPO resin and the non-recycled TPO resin were mixed in appropriate amounts, exhibited hardness of 83 to 88 Hs, elongation at break of 736 to 783%, tensile strength of 175 to 266 kgf/cm$^2$, modulus of 52 to 77 kgf/cm$^2$, and tear strength of 82 to 100 N/mm, confirming that all mechanical properties were excellent.

Accordingly, the vehicle interior sheet including the recycled TPO layer can be applied to any one vehicle interior selected from the group consisting of a door trim, a center, and a door garnish.

As is apparent from the above description, according to an exemplary embodiment of the present disclosure, a vehicle interior sheet enables industrial waste to be recycled, thus reducing the amount of waste, preventing environmental pollution, reducing manufacturing costs, and attaining economically efficient processing.

Furthermore, the vehicle interior sheet according to an exemplary embodiment of the present disclosure has excellent mechanical properties, so it may be applied to any one vehicle interior selected from the group consisting of a door trim, a center, and a door garnish.

Furthermore, a method of manufacturing the vehicle interior sheet according to an exemplary embodiment of the present disclosure is configured for realizing an eco-friendly vehicle interior sheet by pulverizing and pelletizing the waste composite TPO sheet using an extruder under optimized processing conditions.

The effects of the present disclosure are not limited to the above-mentioned effects. It may be understood that the effects of the present disclosure include all effects which may be inferred from the description of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An vehicle interior sheet comprising:
   a recycled Thermoplastic olefin (TPO) layer comprising a recycled TPO resin, wherein the recycled TPO resin is obtained from a waste TPO composite sheet;
   a foam layer disposed under the recycled TPO layer;
   a surface treatment layer disposed above the recycled TPO layer;
   a backside treatment layer disposed under the foam layer,
   wherein the waste TPO composite sheet comprises a crosslinked TPO sheet,
   wherein the crosslinked TPO sheet further comprises an ethylene-propylene diene monomer,
   wherein the recycled TPO layer further comprises a non-recycled TPO resin, a weight ratio of the recycled TPO resin:non-recycled TPO resin is 1:0.1 to 1:9
   wherein the surface treatment layer and the backside treatment layer comprises a polyurethane resin.

2. The vehicle interior sheet of claim 1, wherein the recycled TPO resin comprises at least one of polypropylene, polyethylene, a polypropylene copolymer comprising alpha-olefins having 2 to 12 carbon atoms, a polypropylene terpolymer comprising alpha-olefins having 2 to 12 carbon atoms, a polyethylene copolymer comprising alpha-olefins having 2 to 12 carbon atoms, a polyethylene terpolymer comprising alpha-olefins having 2 to 12 carbon atoms, a diene-based rubber or any combination thereof.

3. The vehicle interior sheet of claim 1, wherein the crosslinked TPO sheet comprises a composite resin comprising polyethylene, polypropylene, sulfur, oil, a reinforcing filler, a vulcanization activator, a vulcanization accelerator, and an antioxidant.

4. The vehicle interior sheet of claim 3,
   wherein the vulcanization activator comprises 1 to 5 parts by weight of zinc oxide and 0.1 to 2 parts by weight of stearic acid, based on 100 parts by weight of the composite resin,
   wherein the vulcanization accelerator is N-(1,3-dimethyl) N'-phenyl-p-phenylenediamine included in amount of 0.1 to 2 parts by weight based on 100 parts by weight of the composite resin,
   wherein the antioxidant is polymerized 2,2,4-trimethyl-1,2-dihydroquinoline included in an amount of 0.1 to 2 parts by weight based on 100 parts by weight of the composite resin.

5. The vehicle interior sheet of claim 1, further comprising:
   a cover layer disposed between the recycled TPO layer and the surface treatment layer;
   wherein the cover layer comprises at least one of polypropylene, polyethylene, a polypropylene copolymer comprising alpha-olefins having 2 to 12 carbon atoms, a polypropylene terpolymer comprising alpha-olefins having 2 to 12 carbon atoms, a polyethylene copolymer comprising alpha-olefins having 2 to 12 carbon atoms, a polyethylene terpolymer comprising alpha-olefins having 2 to 12 carbon atoms or any combination thereof.

6. The vehicle interior sheet of claim 1, wherein the foam layer comprises base resin of polypropylene, polyethylene and further comprises ethylene-propylene rubber,
   wherein the ethylene-propylene rubber is included in an amount of 10 to 30 wt %,
   wherein a weight average molecular weight of the ethylene-propylene rubber is 150,000 to 300,000 g/mol,
   wherein the foam layer comprise a capsule foaming agent in an amount of 3 to 20 parts by weight, based on 100 parts by weight of the base resin.

7. The vehicle interior sheet of claim 1, wherein the recycled TPO layer has a thickness of 0.1 to 0.6 mm,
   wherein the surface treatment layer has a thickness of 1 to 20 μm,
   wherein the foam layer has a thickness of 1.0 to 4.0 mm,
   wherein the backside treatment layer has a thickness of 1 to 5 μm.

* * * * *